US008553302B2

(12) United States Patent
Leister

(10) Patent No.: US 8,553,302 B2
(45) Date of Patent: Oct. 8, 2013

(54) METHOD FOR ENCODING COMPUTER-GENERATED HOLOGRAMS USING A CORRECTION FUNCTION

(75) Inventor: Norbert Leister, Dresden (DE)

(73) Assignee: Seereal Technologies S.A., Munsbach (LU)

(*) Notice: Subject to any disclaimer, the term of this patent is extended or adjusted under 35 U.S.C. 154(b) by 373 days.

(21) Appl. No.: 12/921,845

(22) PCT Filed: Mar. 10, 2009

(86) PCT No.: PCT/EP2009/052749
§ 371 (c)(1),
(2), (4) Date: Sep. 10, 2010

(87) PCT Pub. No.: WO2009/112468
PCT Pub. Date: Sep. 17, 2009

(65) Prior Publication Data
US 2011/0019249 A1    Jan. 27, 2011

(30) Foreign Application Priority Data
Mar. 11, 2008 (DE) .................. 10 2008 000 589

(51) Int. Cl.
*G03H 1/08* (2006.01)

(52) U.S. Cl.
USPC ............................................. 359/9

(58) Field of Classification Search
None
See application file for complete search history.

(56) References Cited

U.S. PATENT DOCUMENTS

2006/0139711 A1* 6/2006 Leister et al. ............. 359/9
2008/0259419 A1* 10/2008 Wilson et al. ............. 359/9
2010/0073744 A1* 3/2010 Zschau et al. ............. 359/9

FOREIGN PATENT DOCUMENTS

DE     10 2004 063 838 A1    7/2006
WO     WO 2004/044659 A2     5/2004
WO     WO 2008/025839 A1     3/2008

OTHER PUBLICATIONS

Thomas Kampfe et al, J. Opt. Soc. Am A vol. 25, No. 7, Jul. 2008 pp. 1609-1614. Designing multiplane computer-generated holograms with consideration of the pixel shape and the illumination wave.*
International Search Report, dated Mar. 16, 2010, and Written Opinion issued in priority International Application No. PCT/EP2009/052749.
International Preliminary Report on Patentability, dated Aug. 12, 2010, issued in priority International Application No. PCT/EP2009/052749.
Dallas, "Computer-Generated Holograms," Computer in Optical Research, Bd. 41, 1, pp. 291-366 (1980).

(Continued)

*Primary Examiner* — Arnel C Lavarias
*Assistant Examiner* — Jyotsna Dabbi
(74) *Attorney, Agent, or Firm* — Saul Ewing LLP

(57) ABSTRACT

A method for encoding computer-generated holograms in pixelated light modulators, the encoding area of which comprises a pixel matrix whose pixels are provided with a pixel form and a pixel transparency, wherein the encoding area contains a hologram made up of sub-holograms, to each of which is assigned an object point of the object to be reconstructed by the hologram. The corruption of the reconstruction of the hologram caused by the real pixel form and the pixel transparency is largely eliminated and the computing time for correction of the hologram is reduced. Each individual computer-generated sub-hologram is multiplied by a correction function, and only thereafter the corrected sub-holograms are added up to form a total hologram, the correction function being based on the reciprocal of the transform of the pixel function (e.g. 1/sinc) associated with the virtual observer window.

15 Claims, 7 Drawing Sheets

(56) References Cited

OTHER PUBLICATIONS

O'Brien et al., "Dynamic holographic interconnects that use ferroelectric liquid-crystal spatial light modulators," Applied Optics, Bd. 33, Nr. 14, pp. 2795-2803 (1994).

Lohmann et al., "Binary Fraunhofer holograms, generated by computer," Applied Optics, OSA, Bd. 6, Nr. 10, pp. 1739-1748 (1967).

Lucente, M. "Interactive computation of holograms using a look-up table," J. electronic Imaging, Bd. 2, Nr. 1, pp. 28-34 (1993).

Wyrowski et al., "Digital holography as part of diffractive optics," Reports on Progress in Physics, Bd. 54, Nr. 12, pp. 1481-1571 (1991).

* cited by examiner

METHOD FOR ENCODING COMPUTER-GENERATED HOLOGRAMS USING A CORRECTION FUNCTION

CROSS REFERENCE TO RELATED APPLICATIONS

This application claims the priority of PCT/EP2009/052749, filed on Mar. 10, 2009, which claims priority to German Application No. 10 2008 000589.4, filed Mar. 11, 2008, the entire contents of which are hereby incorporated in total by reference.

BACKGROUND OF THE INVENTION

The present invention relates to a method for encoding computer-generated holograms in pixelated light modulators whose encoding surface comprises a pixel matrix whose pixels have a certain pixel shape and pixel transparency, where the encoding surface comprises a hologram which is composed of sub-holograms each of which representing one object point of the object which is to be reconstructed by the hologram, where a pyramidal body with a virtual observer window as the defined visibility region and with the object point as the peak is extended beyond the object point and projected onto the encoding surface, thus creating an encoding region in which the object point is holographically encoded as a sub-hologram.

Light modulators with their encoding surfaces are either of a transmissive or reflective type, and they comprise a matrix of pixels with finite extent, which are separated by more or less wide gaps owing to the manufacturing process. In the case of a liquid crystal modulator, the encoding surface is e.g. crossed by a grid of thin electrodes, where the grid represents a matrix of electrodes which intersect at right angles, thus defining rectangular regions between the electrodes, the so-called pixels, which are disposed at a certain distance to each other, the so-called pixel pitch p. The matrix of electrodes is also known as inter-pixel matrix or gap grid, because it exhibits gaps g between the pixels. It can be switched with the help of an electronic controller, in particular with the help of a computer by software means, in order to encode the pixels as regards their amplitude and/or phase such that they exhibit a certain transmittance or reflectance. Pixels which are encoded as transmissive pixels let the incident waves pass, while the pixels which are encoded as reflective pixels reflect the incident waves.

A method for calculating computer-generated video holograms and a corresponding device are known from document DE 10 2004 063 838 A1, where object points with complex amplitude values of a three-dimensional original object are assigned to matrix dots of parallel virtual object section planes in order to define for each object section plane a separate object data set with discrete amplitude values in the form of matrix dots of a given matrix, and to calculate from the object data sets a holographic code for the pixel matrix of a light modulator.

For this, a diffraction pattern is computed in the form of a separate two-dimensional distribution of wave fields for a reference plane, which is situated at a finite distance and parallel to the object section planes, from each object data set of each object section plane, where the wave fields of all object section planes are computed for at least one common virtual observer window which is situated in the reference plane near the eyes of an observer, and whose window area is reduced compared with the hologram.

The calculated distributions for the wave fields of all object section planes are added in a reference data set in order to define an aggregated wave field for the virtual observer window. For generating a hologram data set for the common computer-generated hologram of the object, the reference data set is transformed into a hologram plane, which is situated at a finite distance and parallel to the reference plane that coincides with the plane of the pixel matrix of the light modulator.

The amplitude and phase values of the hologram, which are to be realised in the individual pixels, are also calculated dot by dot for the hologram plane. Typically, two-dimensional light modulators with an encoding surface of m pixel rows at n pixels each are used for recording computer-generated holograms, where the pixels are no points, but have a finite extent and a given shape and a certain amplitude transparency and phase transparency.

One problem of the prior art is that the point-wise computation of the hologram and its representation in pixels with finite extent on the light modulators cause the hologram to be biased and the corresponding instances of imprecision in the visible reconstruction to be perceived by the observer.

The occurring defects are caused by the real extent of the pixels and are based on a conflict between the point-wise computation of the hologram and the real extent of the pixels, which remains unconsidered.

It is also known that the e.g. rectangular pixels of the light modulator, given a uniform transmittance or reflectance, exhibit an amplitude distribution in the form of a sinc function of $$\mathrm{sinc}(x) = \frac{\sin(\pi x)}{\pi x}$$

in a Fourier plane when they are illuminated with coherent light.

The computation of the complex light distributions in the plane of the observer window and in the hologram plane only applies to points which are intersecting points of a given virtual grid. If the complex distributions are represented on a light modulator, then there are pixels which have for example a rectangular shape and which exhibit a constant amplitude and/or phase transparency, as said above. The representation of the complex hologram values in the pixels of a real light modulator is mathematically a convolution of the computed hologram with a rectangular function that represents the pixel extent in the x and y direction. This mathematical process known as convolution causes—during the reconstruction of the hologram—the Fourier transform of the ideal hologram, which is encoded point-wise, to be multiplied with a sinc function which is the Fourier transform of the pixel function, which is a rectangle, in the plane of the observer window. An observer who watches the reconstruction of the object thus perceives this defect.

Serving as a visibility region for an observer in the reference plane, i.e. in a virtual plane which lies immediately in front of the observer eye, an observer window has a given size; it can for example be as large as an eye pupil or be somewhat larger than that, e.g. have twice or three times the size of an eye pupil.

One problem is that the complex wave front in the given observer window and thus also the reconstruction of the three-dimensional object in the space between the observer window and the hologram are biased by the effects of the finite pixel extent in the light modulator, in that for example undesired changes in intensity may occur in the observer window. If the observer window is larger than the eye pupil, then for example the reconstruction of the three-dimensional object appears darker to an observer whose eye pupil is situated near the edge of the observer window than to an observer whose eye pupil is situated in the centre of the observer window. In addition to changes in brightness, there is also noise, i.e. a deterioration in quality of the reconstruction of the three-dimensional scene.

In U.S. Application No. 12/440,478, a hologram computation method based on document DE 10 2004 063 838 A1 is described where a correction is carried out with an inverse or reciprocal of the transform of the pixel shape and the pixel transparency in the observer plane. This requires knowledge of the complex values of the wave front in the observer plane. Fourier transforms are required for this computation.

Document WO2004/044659 A2 describes a device for reconstructing video holograms in which a holographic encoding takes place, as shown in FIG. 1. The three-dimensional object 10 is composed of object points, of which two object points 30, 31 are shown in the drawing. Pyramidal bodies with the observer window 11 as the base and the two selected object points 30, 31 of the object 10 as the respective peaks are extended beyond these object points 30, 31 and projected onto the encoding surface with the desired final hologram 12. Thereby, object-point-related encoding regions 20, 21 in which the object points 30, 31 can be holographically encoded in respective sub-holograms 201, 211 are created on the given encoding surface.

The total hologram is then the complex-valued sum of all sub-holograms. Mainly those sub-regions of the encoding surface which correspond with these encoding regions 20, 21 contribute to the reconstruction of individual object points 30, 31 of the three-dimensional object. The computer-generated holograms 12 are illuminated with an illumination system with an array of micro-lenses 15 to generate the reconstruction.

Holograms for such a device for reconstructing video holograms can be computed according to the method described in document DE 10 2004 063 838 A1.

Another method for computing holograms is described in U.S. Pat. No. 8,437,056, which discloses an analytical computation of sub-holograms on the encoding surface of a light modulator in the form of lens functions. Thereafter, the sub-holograms are added to form a total hologram.

Within the section of the total hologram which is defined by the encoding regions 20, 21, the individual sub-holograms have a substantially constant amplitude whose value is determined depending on brightness and distance of the object points and a phase which corresponds with a lens function, where the focal length of the lens and the size of the encoding regions are variable depending on the depth coordinate of the object point. Outside the section which is defined by the encoding regions 20, 21, the amplitude of the respective sub-holograms is 0. The total hologram is then the complex-valued sum of all sub-holograms. In the case of point-shaped pixels, the virtual observer window would be created based on the total hologram by a Fourier transform or, optionally, by a different transformation, such as a Fresnel transform.

However, for the computation of the hologram according to this method, the wave front in the observer window is not found explicitly mathematically. The method does not use any Fourier or Fresnel transform. The computation thus has the advantage that it takes less computing time compared with the method described in document DE 10 2004 063 838 A1.

The problem is that also in this method for computing holograms the pixel shape and the pixel transparency of the light modulator are not taken into consideration.

SUMMARY OF THE INVENTION

It is therefore an object of the present invention to provide a method for encoding computer-generated holograms on pixelated light modulators, said method being designed such that the bias of the reconstruction of the hologram which is caused by the real shape and transparency of the pixels of the light modulator is widely eliminated, while keeping low the computing time which is needed to find the encoding function on the hologram. In order to achieve the latter it must particularly be prevented that one or multiple Fourier transforms or Fresnel transforms are performed each time when computing holograms for different three-dimensional objects.

The object of this invention is solved with the help of the features of claim 1. The method for encoding computer-generated holograms is carried out for pixelated light modulators whose encoding surfaces have a pixel matrix whose pixels have a certain pixel shape and pixel transparency, where the encoding surface comprises a hologram which is composed of sub-holograms each of which representing one object point of an object which is to be reconstructed by the hologram, where a pyramidal body with a virtual observer window as a defined visibility region and with the object point as a peak is extended beyond the object point and projected onto the encoding surface, thus creating an encoding region in which the object point is holographically encoded as a sub-hologram, where each individual computer-generated sub-hologram is multiplied with a correction function in the encoding region, and only then the corrected sub-holograms are added to form a total hologram, whereby the correction function is directly integrated into the computer generation of the sub-holograms as a transform of the pixel function which is specific for the virtual observer window.

According to a first embodiment of the present invention, the correction function can be an inverse or reciprocal of the transform of the pixel shape and pixel transparency which is scaled to the width of the sub-hologram, where this correction function is preferably found by way of computing it only once for a certain type of light modulator, where it is stored and where the stored values can then be used for the computation of multiple holograms or sub-holograms.

According to this invention, the transmission of the correction function from the observer plane to the hologram plane takes place on the basis of a geometric-optical approximation, i.e. light beams propagate mainly from the edges of a sub-hologram through the object point to be reconstructed to the edge of the observer window, and from the centre of a sub-hologram through the object point to be reconstructed to the centre of the observer window.

The amplitude distribution of a correction function over the observer window is approximately identical to the amplitude distribution of a correction function over the sub-hologram.

Thereby, the mathematically exact correction, which would be a multiplication of the wave front of the object point with the reciprocal of the transform of the pixel shape and pixel transparency in the observer window, can be replaced in approximation by a computation in the plane of the light modulator or an image thereof in that the sub-hologram is multiplied there with the correction function which is scaled to the respective width of the sub-hologram.

The term 'scaling to the width of the sub-hologram' can be understood as follows: An inverse or reciprocal of the transform of the pixel shape and pixel transparency can e.g. have the value '1' in the centre of the observer window and the value '1.5' at the edge of the observer window, where a correction is carried out in that the amplitude of a sub-hologram is multiplied with the value '1' in the centre of the encoding region of the sub-hologram, and with the value '1.5' at the edge of the encoding region of the sub-hologram.

The correction can be carried out for an amplitude of the sub-hologram with real-valued pixel transparency, where the phase of a pixel remains the same across the entire extent of the pixel.

However, it is also possible to carry out a complex-valued correction of amplitude and phase of the sub-hologram.

The correction function depends on the actual pixel shape and pixel transparency, and on the position of the observer window in the plane of the Fourier transform of the hologram, which in turn depends on the given encoding of complex-valued pixels in the form of an amplitude and/or phase encoding.

This embodiment has the advantage that for a certain light modulator with a given pixel shape and pixel transparency, only a single correction function must be computed and stored. However, this embodiment only represents and approximation and thus causes a substantial, but still incomplete correction.

Therefore, a further embodiment will be described which is more intricate, but delivers more precise results. It is based on the fact that the correction function depends on the distance of an object point to the hologram and to the observer, but neither on the brightness of the object point nor on his lateral position.

Therefore, the same correction function can be used for different object points of one or multiple three-dimensional objects which are situated at the same distance to the hologram and observer.

In a second embodiment of the present invention, correction functions are thus determined for certain object point distances.

To find the correction functions, holograms are computed once in advance for such objects which comprise either just a single object point or only object points whose encoding regions of the sub-holograms do not overlap.

The wave front in the observer window can be calculated for these holograms with the help of a reciprocal of the transform. A correction is performed in the observer window by way of a multiplication with the reciprocal of the transform of the pixel shape and pixel transparency of the light modulator.

The corrected wave front in the observer window is transformed into the hologram. Corrected holograms are thereby generated for these objects. The correction function is found for certain object points by comparison of the corrected and uncorrected hologram as the quotients of the original and new amplitude distributions within the encoding regions of the sub-holograms. These correction functions can be stored.

The thus pre-computed correction functions can then be used to achieve a fast correction of the sub-holograms of those objects which have object points that are similar to the object points for which the pre-computation was performed once. Similar object points are in particular those points which are situated about at the same distance to the hologram and observer.

The depth range of three-dimensional objects can be covered by a grid of pre-computed correction functions. Sub-holograms of object points of a three-dimensional scene whose depth coordinate lies between those grid positions can be corrected with the correction function for the grid point whose depth comes closest.

The reciprocal sinc function can serve as correction function for pixels which have a rectangular shape and homogeneous transparency.

If pixels do not have rectangular pixel shapes, i.e. in the case of more complex pixel structures or shapes, other functions than the sinc function can be used for the correction in the respective encoding region of the light modulators.

Since the correction is performed together with the computation of the individual complex-valued sub-holograms, and before the computation of the total hologram, the correction is automatically also performed before a separation of the complex hologram values into amplitude values and phase values for holograms which are encoded on amplitude-modulating or phase-modulating light modulators.

If a complex number is represented on the light modulator by multiple amplitude or phase pixels, the reciprocal of the transform of the pixel shape and pixel transparency of a single light modulator pixel is still important for the correction. However, a different section of this reciprocal of the transform is used because of the size of the observer window and its position in the Fourier plane.

BRIEF DESCRIPTION OF THE DRAWINGS

The present invention is described in more detail below with the help of a number of embodiments and drawings, where.

DETAILED DESCRIPTION OF THE INVENTION

Figure 1:
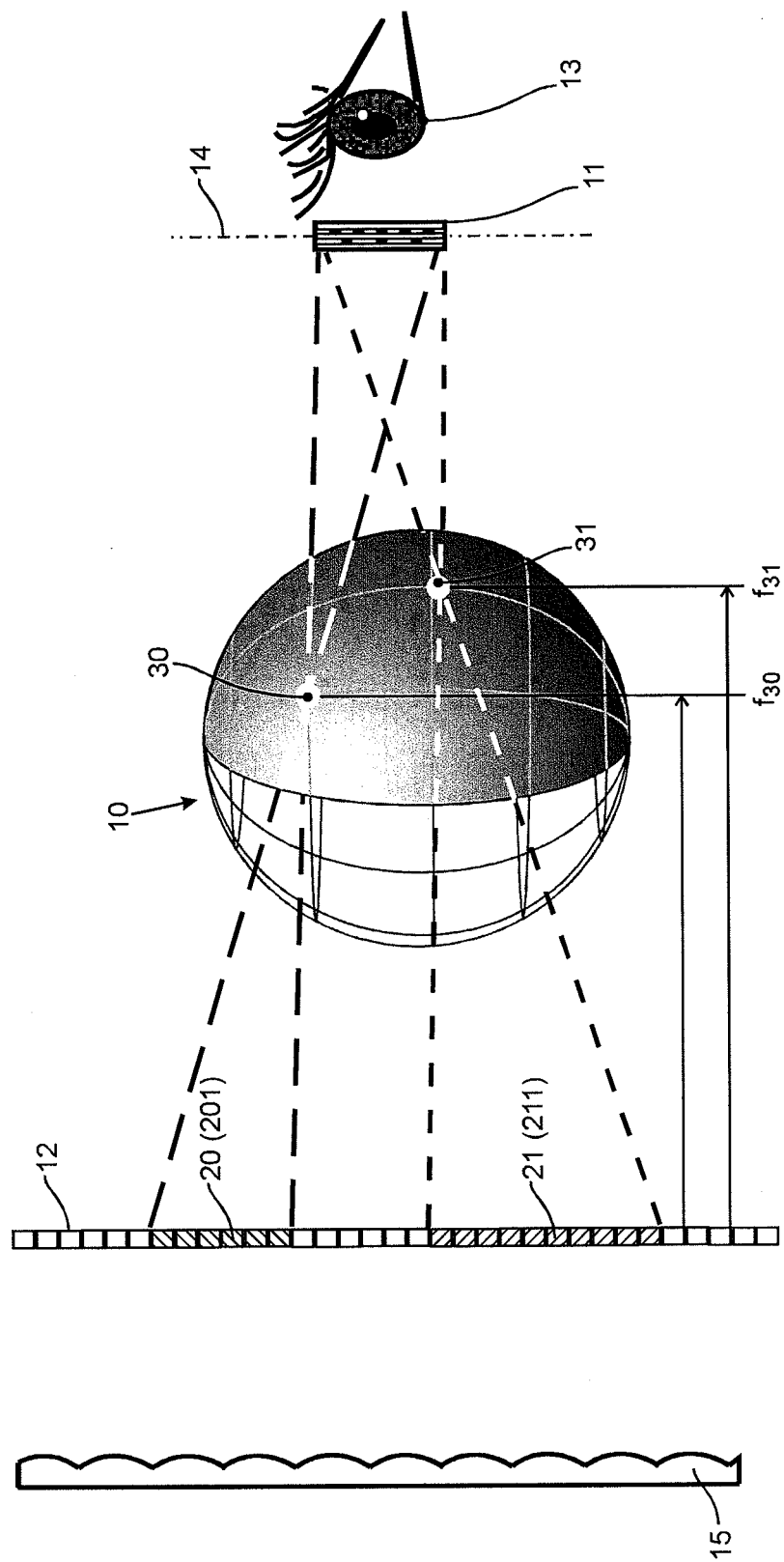
FIG. 1 is a schematic diagram which illustrates a method for the reconstruction of a three-dimensional object with a computer-generated hologram according to the prior art.

Referring to FIG. 1, the method for encoding computer-generated holograms is implemented in pixelated light modulators whose encoding surface has a pixel matrix whose pixels have a certain pixel shape and pixel transparency, where the encoding surface comprises a hologram 12 which is composed of sub-holograms 201, 211 each of which representing one object point 30, 31 of the object 10 which is to be reconstructed by the hologram 12, where a pyramidal body with a virtual observer window 11 as the defined visibility region and with the object point 30, 31 as the peak is extended beyond the object point 30, 31 and projected onto the encoding surface, thus creating an encoding region 20, 21 in which the object point 30, 31 is holographically encoded as a sub-hologram 201, 211.

According to this invention, each individual computer-generated sub-hologram 201, 211 is multiplied with a correction function K, and only then the corrected sub-holograms 201, 211 are added to form a total hologram 12.

A possible but not favoured embodiment is to calculate the wave front of each individual object point in the observer window, to multiply it there with the inverse or reciprocal of the transform of the pixel shape and pixel transparency so to achieve a correction, then to transform the corrected wave front onto the encoding surface and to get a corrected sub-hologram there. Thereafter, the corrected sub-holograms could be added to a total hologram. This embodiment has the disadvantage of a very high computational load.

Figure 2:
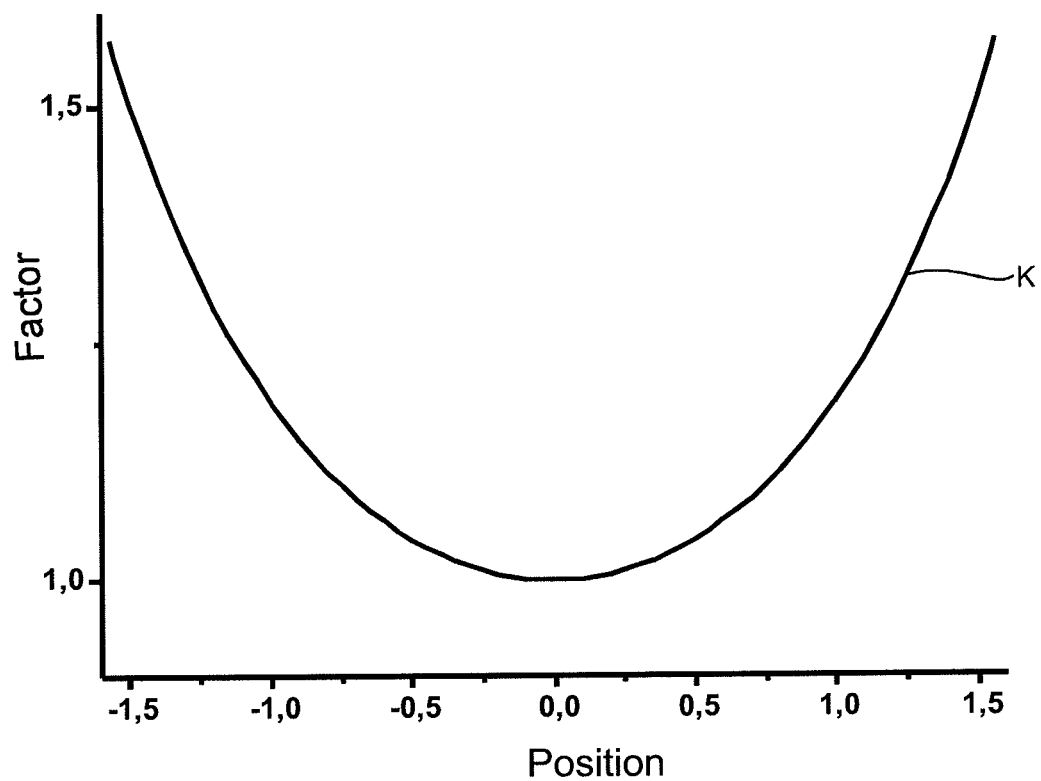
FIG. 2 is a correction function in the form of a section of a 1/sinc function in the plane of the Fourier transform of a pixel, the section being of a size of an observer window.

FIG. 2 shows a cross-section through a correction function K with which the computed wave fronts must be multiplied, where the correction function K is a section of the size of an observer window of a reciprocal sinc function, as can be the result for a rectangular pixel with constant transparency. The section corresponds with the case that always one hologram value is encoded in one pixel of the light modulator.

The reciprocal sinc function can serve as transforming correction function K for pixels which have a rectangular shape and homogeneous transparency.

If pixels do not have rectangular pixel shapes, i.e. in the case of more complex pixel structures or shapes, a different transform than the sinc function can be used for the correction in the respective encoding region of the light modulators.

A first preferred embodiment takes advantage of a geometric-optical approximation to get a correction function. Referring to FIG. 1, light beams propagate from the edge of the encoding regions 20, 21 of the sub-holograms 201, 211 through the object points 30, 31 towards the opposing edge of the observer window 11. A light beam from the centre of the encoding regions would propagate accordingly towards the centre of the observer window.

The geometric approximation thus realises an allocation of a certain position within the encoding region of the sub-hologram with a certain position within the observer window.

A multiplicative correction with a correction function in the observer window can preferably be replaced in this approximation by a multiplicative correction of the sub-hologram with a correction function which is scaled to the width of the sub-hologram of the encoding region which takes place directly in the encoding surface.

Figures 3, 3A:
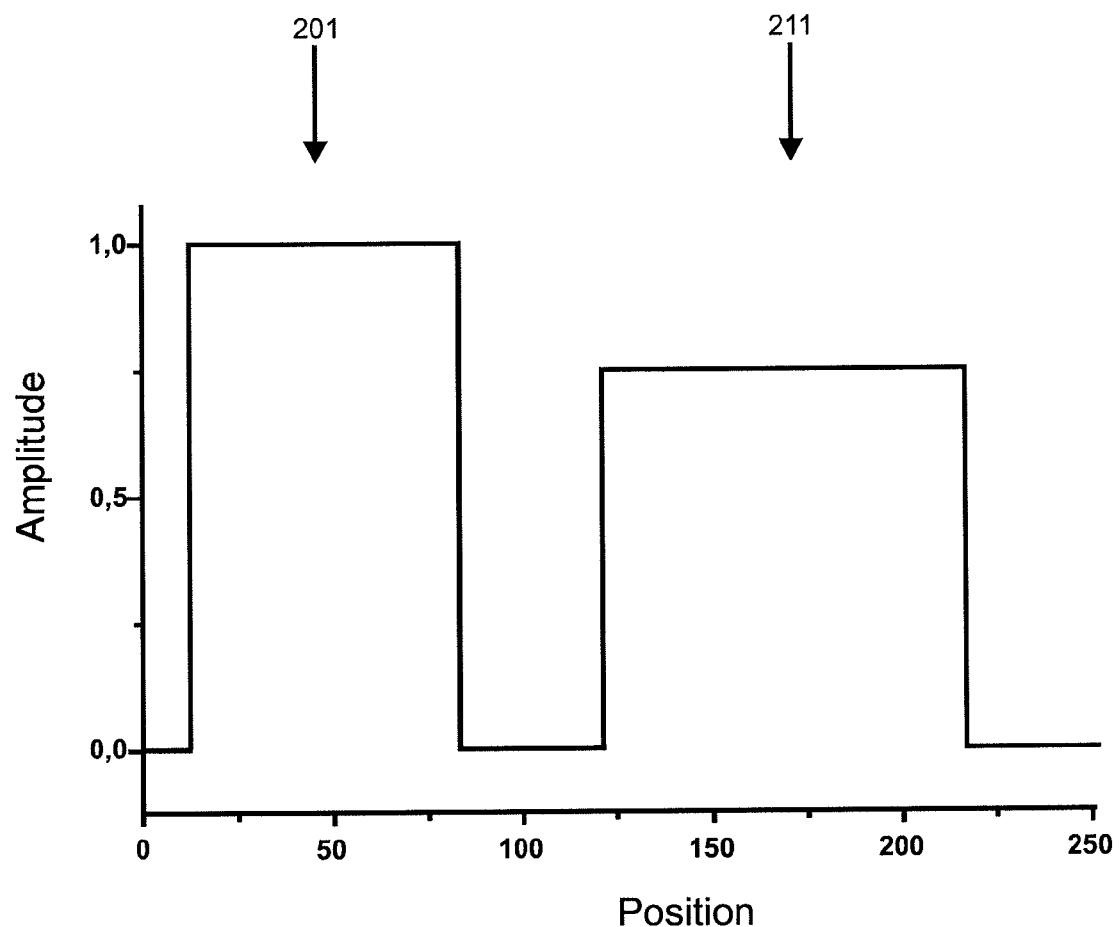
FIG. 3 shows an amplitude representation of a hologram as a sum of two sub-holograms, where
FIG. 3a illustrates the uncorrected amplitude of two sub-holograms which differ in size as they belong to object points which are situated at different depths.
Figure 3B:
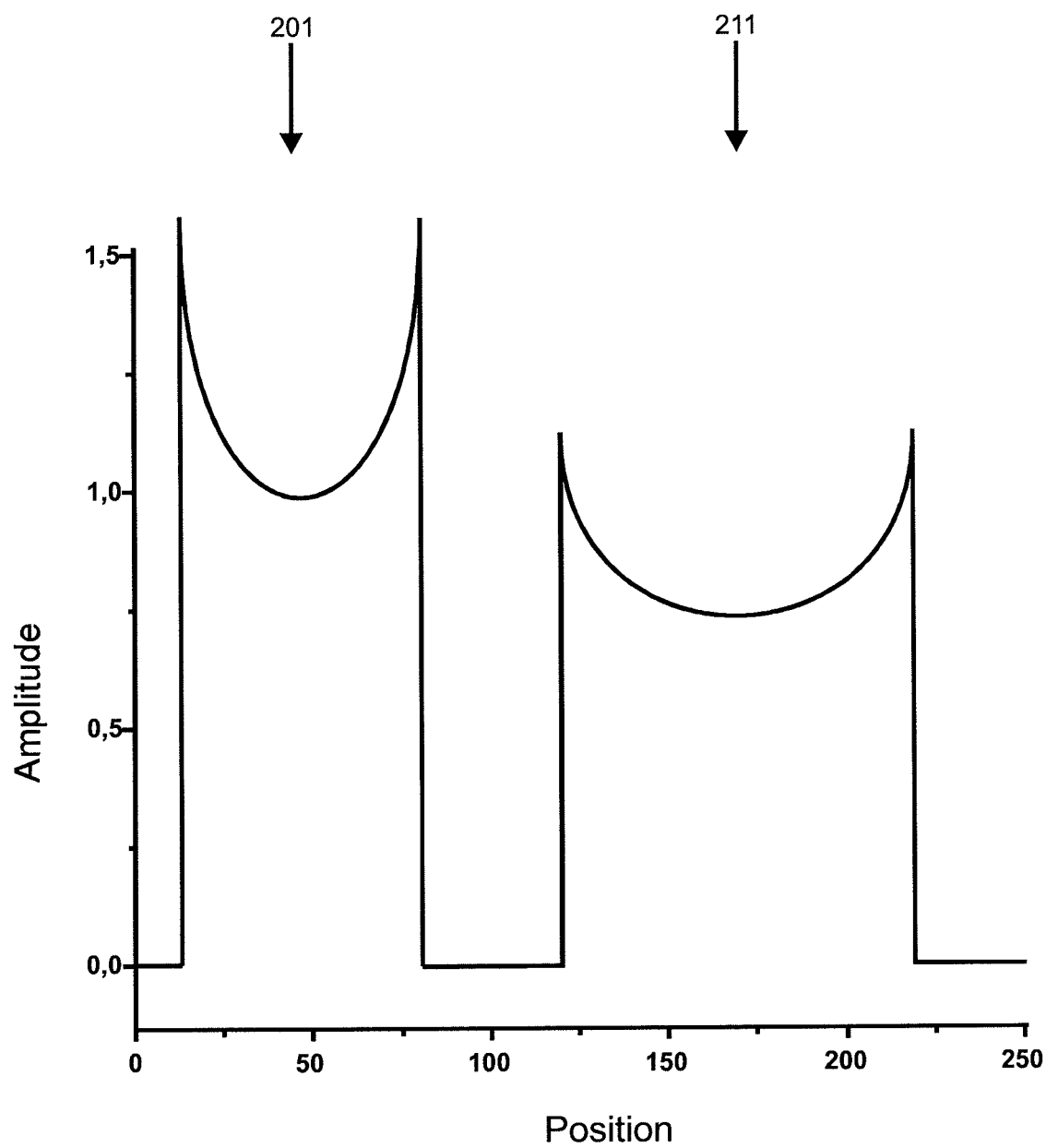
FIG. 3b illustrates the corrected amplitude of the two sub-holograms, which has been corrected according to a first embodiment of this invention by multiplication of the amplitude distribution shown in FIG. 3a with the correction function shown in FIG. 2 which is scaled to the respective widths of the two sub-holograms.

FIG. 3a shows according to this embodiment a cross-section through the amplitude curve in the uncorrected state for a hologram as a sum of two sub-holograms 20, 21 of two object points 30, 31 which are situated at different depths $f_{30}$, $f_{31}$ —defined as focal points with corresponding focal lengths—in an analytic computation. While the phases in the encoding regions 20, 21, which correspond with the sub-holograms 201, 211, each correspond with a lens function, the amplitude in the encoding regions of the sub-holograms 201, 211 can be set at a constant value. However, this already represents an approximation. Due to the different depths $f_{30}$, $f_{31}$, the corresponding focal lengths of the lens functions (not shown here) and the size of the sub-holograms 201, 211 differ. FIG. 3b shows the amplitudes of the sub-holograms 201, 211 which are corrected directly on the encoding surface. The correction function for the sub-holograms corresponds with the value distribution of the function shown in FIG. 2 for the observer window. The width of the correction function is scaled differently, according to the different size of the two sub-holograms 201, 211.

This embodiment of the correction method has the advantage of a simple realisation, but it only represents an approximation.

A second, also preferred embodiment is somewhat more intricate, but delivers more precise results. In this embodiment, correction functions are pre-computed once by way of a correction in the observer window for object points which are situated at different distances to the encoding surface, and these correction functions are stored for subsequent usage for the correction of holograms with object points at the same distance to the encoding surface and to the observer window. This correction can then also be performed directly on the encoding surface.

Figures 4, 4A:
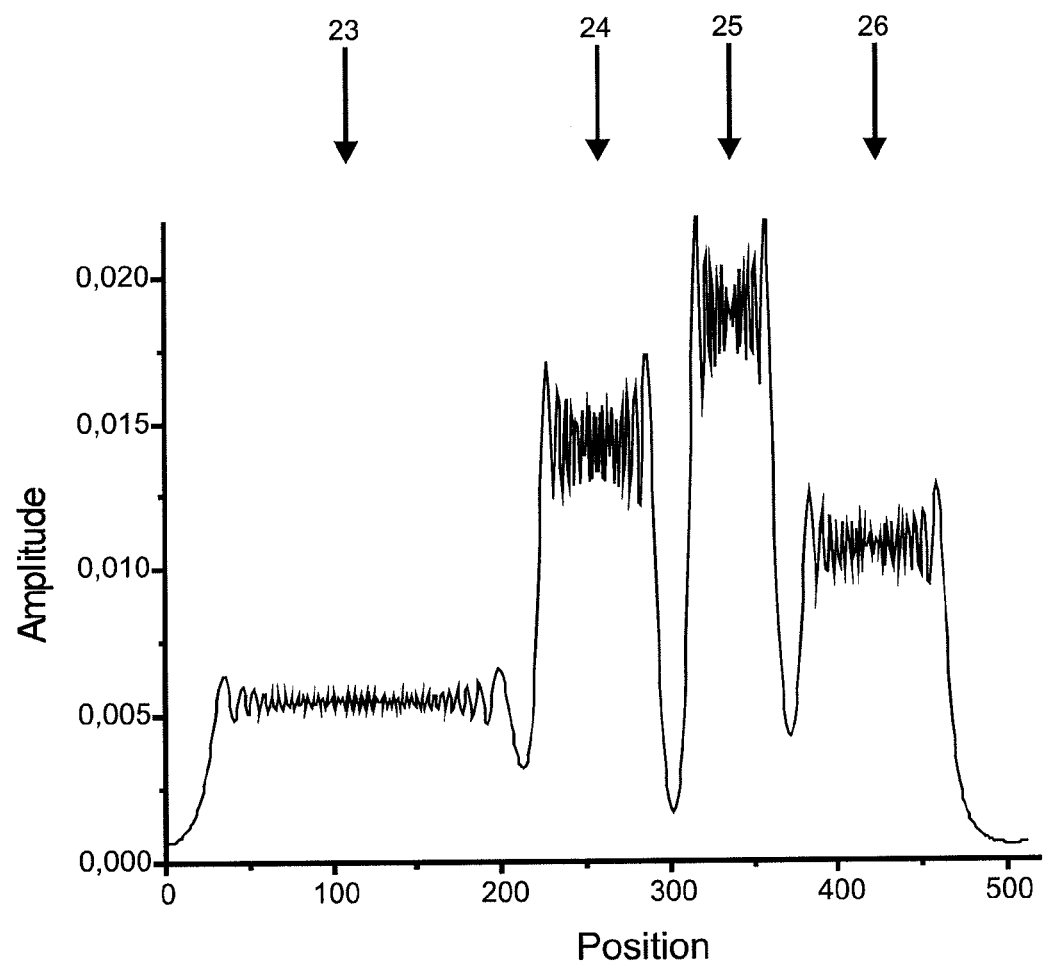
FIG. 4 shows amplitude representations of holograms, where
FIG. 4a illustrates an uncorrected hologram of a three-dimensional object which consist of four individual points which are situated at different distances to the encoding surface whose encoding regions do not or only slightly overlap, said hologram having been computed with the help of a Fresnel transform and a Fourier transform.

To illustrate this embodiment, FIG. 4a shows a cross-section through the hologram amplitudes for a hologram which has in this case been computed with Fresnel transforms and Fourier transforms in accordance with DE 10 2004 063 838 A1.

The object—a three-dimensional scene—comprises four different object points which are situated at different distances to the encoding surface. The lateral positions of those 4 points is chosen such that the encoding regions 20, 21 according to FIG. 1 of the corresponding sub-holograms do not substantially overlap.

FIG. 4a shows a cross-section of the amplitude distribution in the uncorrected hologram. This amplitude distribution comprises four sections representative of individual sub-holograms 23, 24, 25 and 26. The sub-holograms 23, 24, 25 and 26 differ in size depending on the distance of the corresponding object points to the encoding surface. In contrast to FIG. 3a, the amplitudes are not constant across the sub-holograms but exhibit small periodic fluctuations caused by a convolution with the transform of the rectangular observer window 11.

Figure 4B:
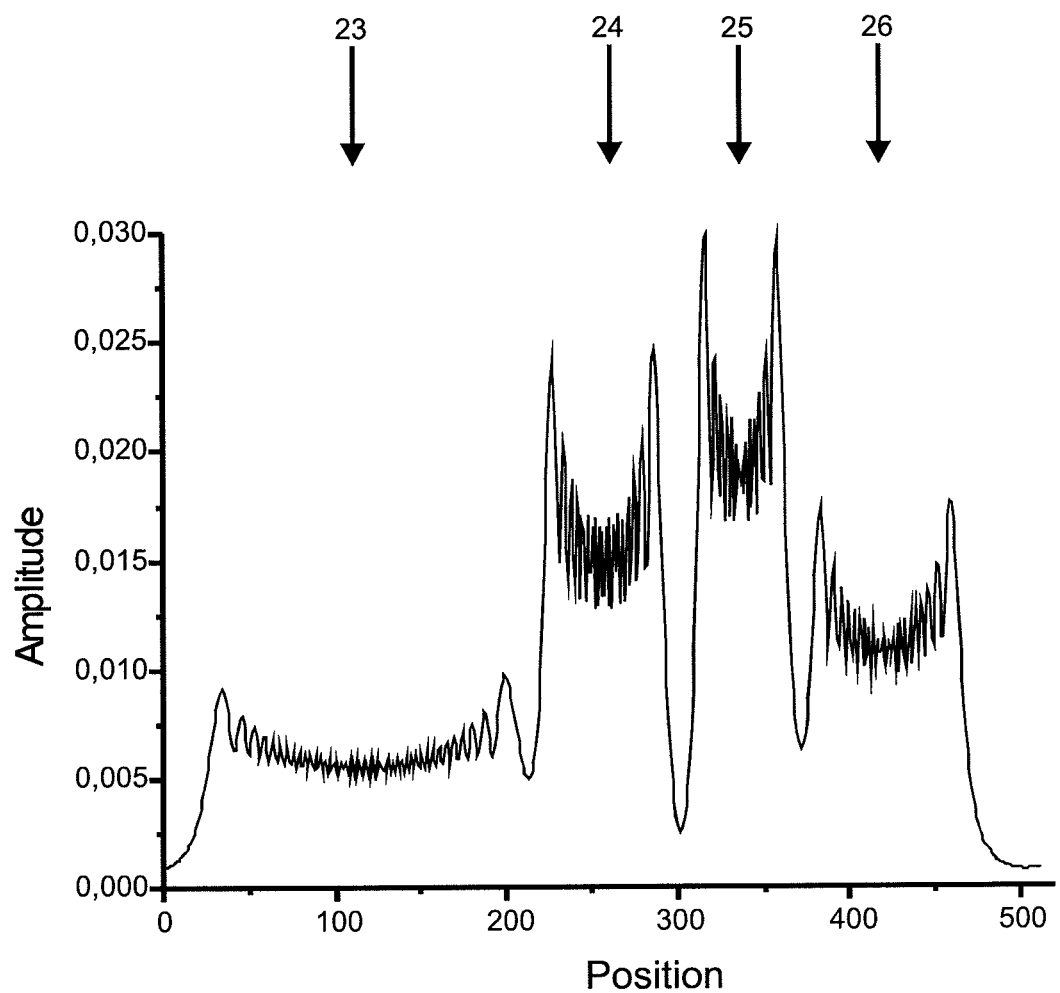
FIG. 4b illustrates a hologram of a three-dimensional object which comprises four individual points which are situated at different distances to the encoding surface, said hologram having been computed with the help of a Fresnel transform and a Fourier transform and corrected in the observer window.

FIG. 4b shows the hologram after the computation of the same three-dimensional object—again with Fresnel and Fourier transforms—but this time additionally including the multiplicative correction with the reciprocal of the transform of the pixel function according to FIG. 2 in the observer window.

The correction in the observer window causes the amplitudes of the sub-holograms 23, 24, 25 and 26 to be changed. When comparing the corrected and uncorrected amplitudes as in FIGS. 4a and 4b, correction functions can be computed once in advance by way of generating the quotients of the two for the object points which are situated at different distances.

Figure 5:
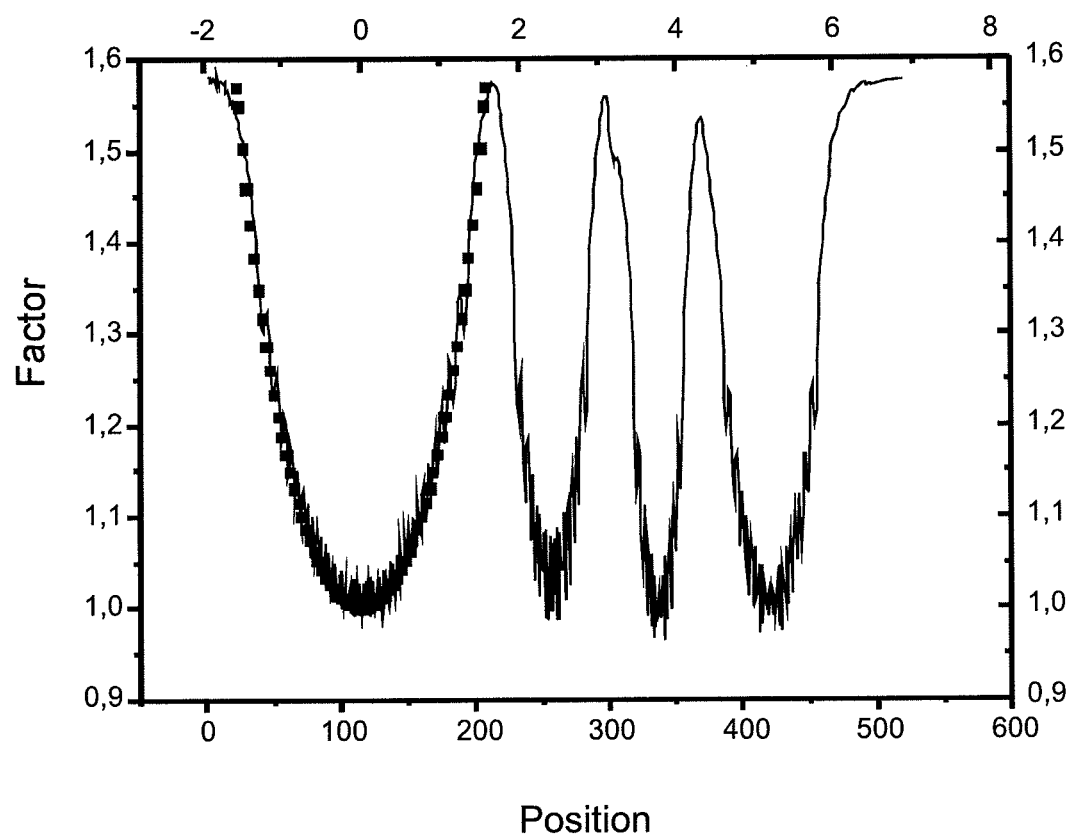
FIG. 5 shows the quotient of the curves of FIG. 4b and FIG. 4a, which provides correction factors for the respective position in the hologram for determining 4 sections with 4 correction functions for 4 different distances of object points to the encoding surface, where the correction function being scaled to the left sub-hologram according to FIG. 3 is shown as a dotted line for comparison.

FIG. 5 shows the quotient of the distribution in FIG. 4b, 4a. In this case, 4 different correction functions could be extracted from the 4 different sections of this curve for object points which are situated at different distances to the encoding surface.

Alternatively, the entire amplitude distribution of the sub-holograms as in FIG. 4a could be stored, because the latter also only varies as the distance changes.

For a comparison, the correction function being scaled to the width of the sub-hologram on the left-hand side according to the method illustrated in FIG. 3 is provided as a dotted line in the drawing. It can be seen that both embodiments produce very similar correction functions here. The method illustrated in FIG. 4 delivers the more precise correction though. However, the method illustrated in FIG. 3 represents a practicable approximation.

The method can also, be employed if the complex hologram values are not encoded in one pixel in the light modulator, but if multiple pixels are used to encode one complex value, e.g. in the form of amplitude values or phase values.

This will now be explained using the example of a Burckhardt encoding. With the help of this encoding method, a complex number is represented by three amplitude values, which are written to three adjacent pixels of a light modulator.

The hologram, which is real-valued in this case, exhibits a symmetrical Fourier transform. In this type of encoding, the observer window lies outside the centre of the Fourier plane on one side.

The correction method is also in this case performed with the section with the size of the observer window of the reciprocal of the transform of pixel shape and transparency of the single pixel of the light modulator.

Due to the size and position of the observer window in the Fourier plane which results from the Burckhardt encoding method, this section must be a different one than that in the example shown in FIG. 2. With a pixel of rectangular transparency, this would for example be the right-hand side third of the function shown in FIG. 2.

For amplitude encoding or phase encoding, sub-holograms can be corrected in a geometric-optical approximation according to one embodiment, or correction functions can be pre-computed according to another embodiment with the help of a section of the reciprocal of the transform of pixel shape and pixel transparency which is selected to match the size and position of the observer window.

| List of reference numerals | |
|---|---|
| 10 | Object |
| 11 | Observer window |
| 12 | Hologram |
| 13 | Eye |
| 14 | Reference plane |
| 15 | Array of micro-lenses |
| 20 | First encoding region of the encoding surface |
| 201 | First sub-hologram |
| 21 | Second encoding region of the encoding surface |
| 211 | Second sub-hologram |
| 30 | First object point |
| 31 | Second object point |
| $f_{30}$ | Depth, focal length |
| $f_{30}$ | Depth, focal length |
| K | Correction function |

The invention claimed is:

1. A method for encoding computer-generated holograms into pixelated light modulators, each light modulator having an encoding surface that includes a pixel matrix whose pixels have a certain pixel shape and pixel transparency, comprising the steps of:
creating an encoding region by extending a pyramidal body with a virtual observer window localized in a Fourier plane of the light modulator as a defined visibility region and with an object point of an object as a peak beyond the object point and projecting onto the encoding surface, and holographically encoding the object point as a sub-hologram,
multiplying each individual sub-hologram with a correction function, wherein the correction function is a virtual-observer-window-specific reciprocal of the transform of the pixel shape and pixel transparency and is projected into a hologram plane,
adding the corrected sub-holograms to form an entire hologram,
encoding the entire hologram into the encoding surface of the light modulator as a computer-generated hologram composed of said sub-holograms, each representing one object point of an object which is to be reconstructed by the hologram.

2. Method according to claim 1, wherein a reciprocal of the transform of the pixel shape and pixel transparency is used as the correction function, where said reciprocal of the transform is projected into the hologram plane and is scaled to the width of the sub-hologram.

3. Method according to claim 2, wherein the reciprocal of the transform of the pixel shape and pixel transparency has the value '1' in the centre of the virtual observer window and the value '1.5' at an edge of the virtual observer window, where a correction is carried out in that the amplitude of a sub-hologram is multiplied with the value '1' in the centre of the sub-hologram, and with the value '1.5' at the edge of the sub-hologram.

4. Method according to claim 2, wherein the correction is carried out for an amplitude of the sub-hologram with real-valued pixel transparency, where the phase of a pixel remains the same across the entire extent of the pixel.

5. Method according to claim 1, wherein a complex-valued correction of amplitude and phase of the sub-hologram is carried out.

6. Method according to claim 1, wherein the correction function depends on the actual pixel shape and pixel transparency, and on the position of the virtual observer window in the Fourier plane of the light modulator where the position depends on the given encoding of complex-valued pixels in the form of an amplitude and/or phase encoding.

7. Method according to claim 1, wherein for finding the correction function comprising the steps of:
computing of holograms once in advance for such objects which comprise either just a single object point or only object points whose encoding regions of the sub-holograms do not overlap,
correcting the sub-holograms of those holograms with the reciprocal of the transform of the pixel shape and pixel transparency in the virtual observer window
determining of the correction function for certain object points by comparison of the corrected holograms with the uncorrected holograms.

8. Method according to claim 7, wherein the amplitude distribution which is changed by the correction is determined for the individual sub-holograms after a transformation of wave fronts into the hologram plane, the wave fronts being corrected in the virtual observer window, in order to get correction functions based on those distributions for all object points which lie in the same depths relating to the encoding surface as the points of the object which were included in that computation.

9. Method according to claim 8, wherein the correction values for object points are found once in advance in different depths relating to the encoding surface and stored to be retrieved subsequently for correcting sub-holograms.

10. Method according to claim 4, wherein for pixels with rectangular shape and uniform transparency the reciprocal of the sinc function is used as correction function.

11. Method according to claim 4, wherein in case of other than rectangular pixel shapes, with more complex pixel structures or shapes on the respective encoding surface of the light modulators, correction functions other than the reciprocal of the sinc function are used for the multiplication.

12. Method according to claim 3, wherein the correction is carried out for an amplitude of the sub-hologram with real-valued pixel transparency, where the phase of a pixel remains the same across the entire extent of the pixel.

13. Method according to claim 12, wherein for pixels with rectangular shape and uniform transparency the reciprocal of the sinc function is used as correction function.

14. Method according to claim 12, wherein in case of other than rectangular pixel shapes, with more complex pixel structures or shapes on the respective encoding surface of the light modulators, correction functions other than the reciprocal of the sinc function are used for the multiplication.

15. Method according to claim 5, wherein in case of other than rectangular pixel shapes, with more complex pixel structures or shapes on the respective encoding surface of the light modulators, correction functions other than the reciprocal of the sinc function are used for the multiplication.

* * * * *